(12) United States Patent
Mittmann et al.

(10) Patent No.: US 12,162,095 B2
(45) Date of Patent: Dec. 10, 2024

(54) METHOD AND APPARATUS FOR FIXING A SOLDERING TIP TO A SOLDERING TOOL

(71) Applicant: APEX BRANDS, INC., Apex, NC (US)

(72) Inventors: Gert Mittmann, Möckmühl (DE); Ralf Zerweck, Bönnigheim (DE)

(73) Assignee: APEX BRANDS, INC., Apex, NC (US)

( * ) Notice: Subject to any disclaimer, the term of this patent is extended or adjusted under 35 U.S.C. 154(b) by 1030 days.

(21) Appl. No.: 17/052,627

(22) PCT Filed: May 3, 2019

(86) PCT No.: PCT/US2019/030587
§ 371 (c)(1),
(2) Date: Nov. 3, 2020

(87) PCT Pub. No.: WO2019/213512
PCT Pub. Date: Nov. 7, 2019

(65) Prior Publication Data
US 2021/0237185 A1  Aug. 5, 2021

Related U.S. Application Data

(60) Provisional application No. 62/666,824, filed on May 4, 2018.

(51) Int. Cl.
*B23K 3/03* (2006.01)
*H05B 1/02* (2006.01)

(52) U.S. Cl.
CPC ......... *B23K 3/0338* (2013.01); *H05B 1/0227* (2013.01)

(58) Field of Classification Search
None
See application file for complete search history.

(56) References Cited

U.S. PATENT DOCUMENTS 1,667,618 A * 4/1928 Abbott ................. B23K 3/025
228/59
1,829,457 A * 10/1931 Schmidt ............... B23K 3/0307
219/234

(Continued)

FOREIGN PATENT DOCUMENTS

GB         227448 A      5/1925
JP      2000176636 A *   6/2000

OTHER PUBLICATIONS

International Search Report and Written Opinion from related international application PCT/US2019/030587, mailed on Jul. 11, 2019, all pages cited in its entirety.

(Continued)

*Primary Examiner* — Devang R Patel
(74) *Attorney, Agent, or Firm* — BURR & FORMAN LLP

(57) ABSTRACT

A soldering tool may include a power unit including a controller, a tool body configured to interface with the power unit, and a tip portion operably coupled to the tool body. The tip portion may include a tip that is heated to melt solder by a heating element controlled by the controller. The tip is operably coupled to the heating element via a braze joint. The heating element may be operable at a first temperature range for melting the solder and a second temperature range, higher than the first temperature range, to facilitate forming or braking the braze joint.

17 Claims, 6 Drawing Sheets

(56) References Cited

U.S. PATENT DOCUMENTS

| | | | | |
|---|---|---|---|---|
| 2,717,952 | A | 9/1955 | Dvorak | |
| 3,651,306 | A | 3/1972 | Glyptis | |
| 5,945,015 | A | 8/1999 | Feinler | |
| 6,215,104 | B1 * | 4/2001 | Kurpiela | B23K 3/0369 219/230 |
| 6,563,087 | B1 * | 5/2003 | Yokoyama | B23K 3/033 219/490 |
| 7,030,339 | B2 * | 4/2006 | Nagase | B23K 3/025 219/229 |
| 8,237,091 | B2 * | 8/2012 | Yoshimura | B23K 3/0361 219/229 |
| 2005/0011876 | A1 * | 1/2005 | Uetani | B23K 3/025 219/229 |
| 2007/0272725 | A1 * | 11/2007 | Zerweck | B23K 3/0315 228/55 |
| 2015/0202753 | A1 | 7/2015 | Mittmann | |
| 2015/0246404 | A1 * | 9/2015 | Teraoka | G05B 15/02 219/129 |
| 2016/0325371 | A1 * | 11/2016 | Zerweck | B23K 3/0369 |
| 2017/0173719 | A1 | 6/2017 | Nguyen et al. | |
| 2018/0001409 | A1 * | 1/2018 | Tsai | B23K 3/0338 |
| 2018/0111213 | A1 | 4/2018 | Mantes et al. | |

OTHER PUBLICATIONS

Extended European Search Report from European Application No. 19796692.2 dated Dec. 22, 2021, all pages cited in its entirety.

* cited by examiner

METHOD AND APPARATUS FOR FIXING A SOLDERING TIP TO A SOLDERING TOOL

CROSS REFERENCE TO RELATED APPLICATIONS

This application claims priority to U.S. application No. 62/666,824 filed May 4, 2018, the entire contents of which are hereby incorporated by reference in its entirety.

TECHNICAL FIELD

Example embodiments generally relate to soldering tools and, in particular, relate to such a tool having a capability to use replaceable soldering tips that are fixed (and sometimes also removed) using internally generated heat sources.

BACKGROUND

Soldering tools, which are sometimes referred to as soldering irons or soldering guns, are commonly used in electronics manufacturing and repair activities along with other crafts and industries that involve metalwork. Soldering tools are typically used to join metallic items together at a joint by melting a filler metal (i.e., solder) into the joint. The solder has a lower melting point than the items being joined together at the joint, so the soldering tool needs to apply heat sufficient to melt the solder, but not hot enough to melt the items being joined.

Although a number of soldering tool designs have been proposed, a basic soldering tool design includes at least a tip portion that is operably coupled to a heater. The tip portion may, due to operation of the heater, become hot enough to melt the solder that contacts the tip portion. The tip portion may, in some cases, be removable/interchangeable so that a number of different geometries (e.g., sizes and/or shapes) of tips or bits can be substituted for respective different jobs. For example, some tip geometries (or shapes) may include a fine conical tip, a tapered chisel tip, a pyramid tip, a triangular flat face tip, a wide flat face tip, etc., where different sizes may further be available within each respective shape category.

For a typical soldering tool, the tip portion can become fouled over time and the efficiency of the heat transfer to and from the tip portion may be reduced. If the tip portion is not replaceable, it may become necessary to buy an entirely new soldering tool. However, if the tip portion was replaceable, it may be possible to reduce the overall cost of owning and operating the soldering tool by providing relatively low cost replacement tips.

The provision of relatively low cost replacement tips, however, potentially creates a new set of problems for the owner/operator of the soldering tool. In this regard, for the simplest or easiest forms of replacement (e.g., a snap, threaded or capture fitting of some sort), there may be spaces between the tip portion and a base portion to which the tip portion is attached. These spaces may again cause reductions in efficiency of heat transfer that negatively impact the operation of the soldering tool. To achieve maximum heat transfer efficiency between the tip portion and the base portion, brazing or welding of the tip portion to the base portion is often preferred. However, such brazing or welding is normally done at much higher temperatures than the temperatures that melt solder, and is performed by devices and operations that are beyond the reach of the owner/operator.

Accordingly, it may be desirable to develop a soldering tool that may include a replaceable tip that is capable of being efficiently coupled to the base portion by owners and operators without complicated or expensive external resources and methods.

BRIEF SUMMARY OF SOME EXAMPLES

Some example embodiments may enable the provision of methods and devices that enable the soldering tip of a soldering tool to be replaceable without sacrificing efficiency.

In an example embodiment, a soldering tool may be provided. The soldering tool may include a power unit including a controller, a tool body configured to interface with the power unit, and a tip portion operably coupled to the tool body. The tip portion may include a tip that is heated to melt solder by a heating element controlled by the controller. The tip is operably coupled to the heating element via a braze joint. The heating element may be operable at a first temperature range for melting the solder and a second temperature range, higher than the first temperature range, to facilitate forming or braking the braze joint.

In another example embodiment, a method of installing a tip at a tip portion of a soldering tool is provided. The method may include operating a heating element of the soldering tool, where the heating element is configured to melt solder at a first temperature range, at a second temperature range that is higher than the first temperature range. The method may further include providing a brazing filler material in a receiving cavity of the tip, and inserting a distal end of the heating element into the receiving cavity to melt the brazing filler material into a space defined between the heating element and the receiving cavity to form a braze joint between the heating element and the tip. Within the context of the method described above, it should be appreciated that the brazing filler material has a melting point above the first temperature range and below the second temperature range. The first temperature range may be less than about 450° C. and the second temperature range may be greater than about 600° C.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 3A:
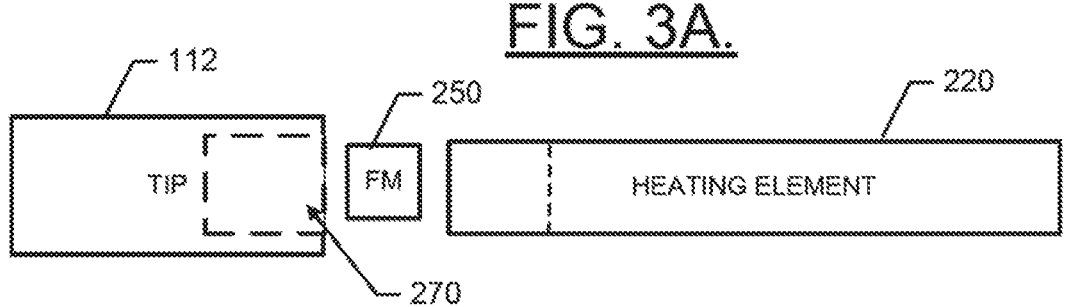
Figure 3B:
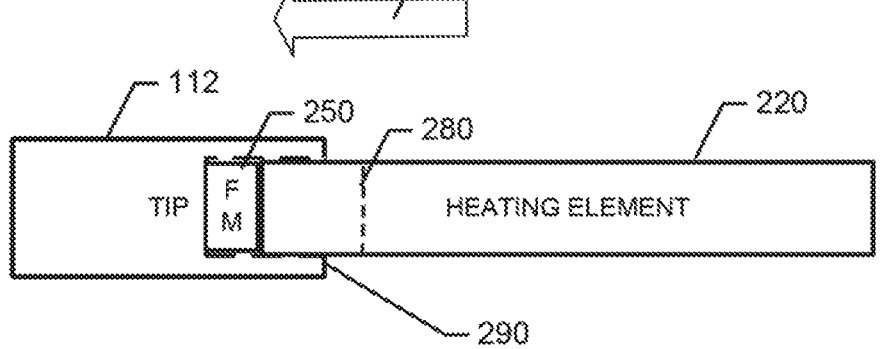
Figure 3C:
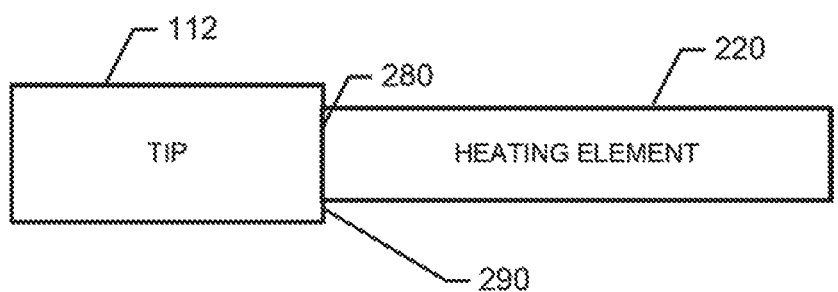
Figure 4A:
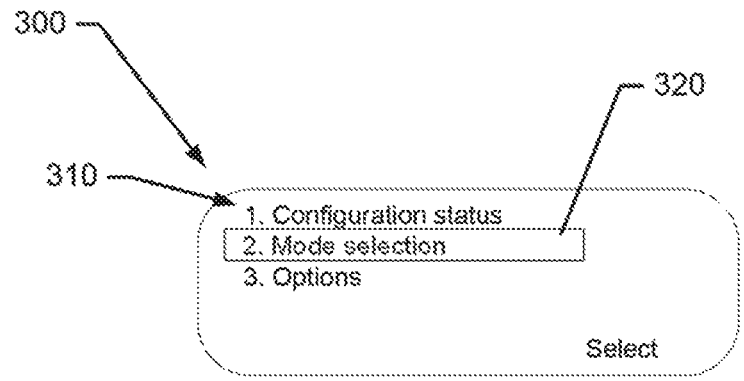
Figure 4B:
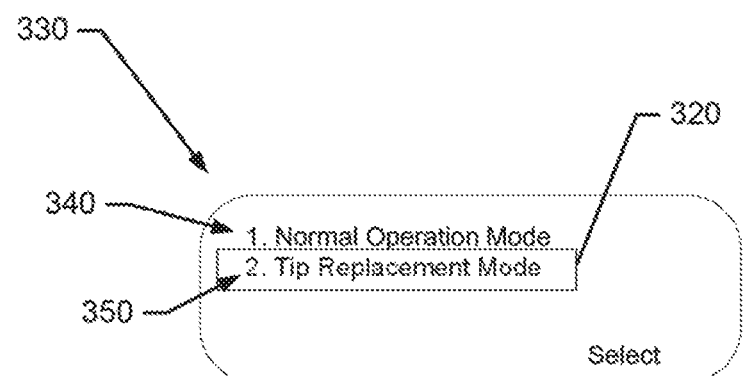
Figure 4C:
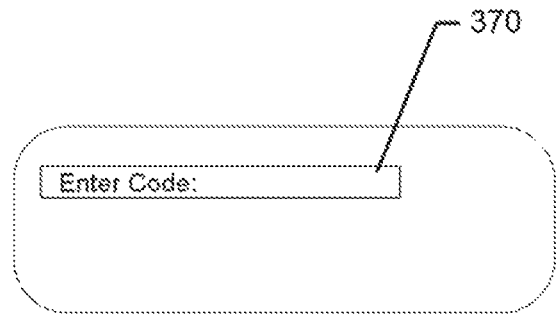
Figure 4D:
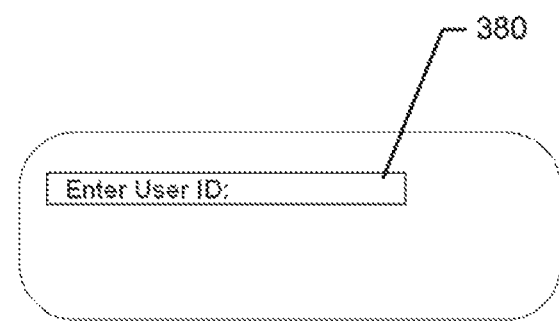
Figure 5:
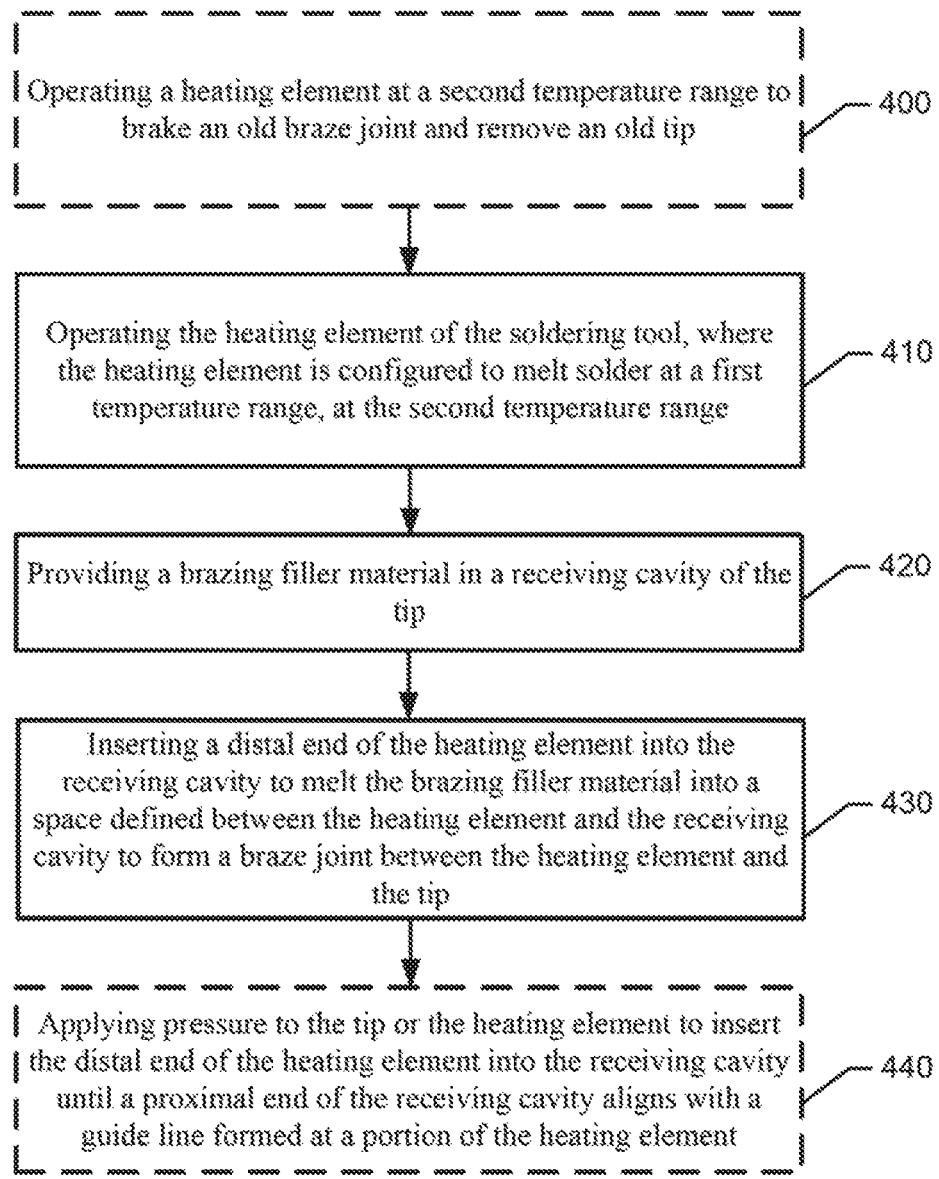

FIG. 3, which is defined by FIGS. 3A, 3B and 3C, illustrates a conceptual block diagram of various components associated with a process by which a braze joint may be formed or broken between the heating element and the tip of the soldering tool in accordance with an example embodiment;

FIG. 4A illustrates a display of menu options for the power unit that enables mode selection in accordance with an example embodiment;

FIG. 4B illustrates a display of menu options for normal operation and tip replacement in accordance with an example embodiment;

FIG. 4C illustrates a display for receipt of an authorization code to enter the tip replacement mode in accordance with an example embodiment;

FIG. 4D illustrates a display of an option for entering a user identifier for an operator, which may dictate options available to the operator relative to operation of the soldering tool in accordance with an example embodiment; and FIG. 5 illustrates a method of installing a tip at a tip portion of a soldering tool in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of a soldering tool that includes the ability to weld or braze a replacement tip. Presently, there are generally two types of tips used with soldering irons or other soldering tools. Active tips are essentially a single piece since the tip portion is welded or brazed to the heating element. When the tip portion is no longer effective due to fouling or reduced efficiency, the soldering tool is effectively useless, and must be replaced. Passive tips are not brazed or soldered to the heating element, and are therefore replaceable by the operator. However, the lack of brazing or soldering that enables the replacement of the passive tip further results in air gaps being formed between the tip portion and the heating element. These air gaps reduce thermal efficiency, and reduce the performance of the soldering tools that employ passive tips. By providing a soldering tool that includes the ability to enable the operator to weld or braze a replacement tip, active tips become also replaceable tips. Thus, one of the hallmarks of an active tip is fundamentally changed, since active tips will also be replaceable. Accordingly, costs of ownership of soldering tools that employ active tips may be reduced while also improving the performance and longevity of the devices, along with operator/owner satisfaction.

Figure 1:
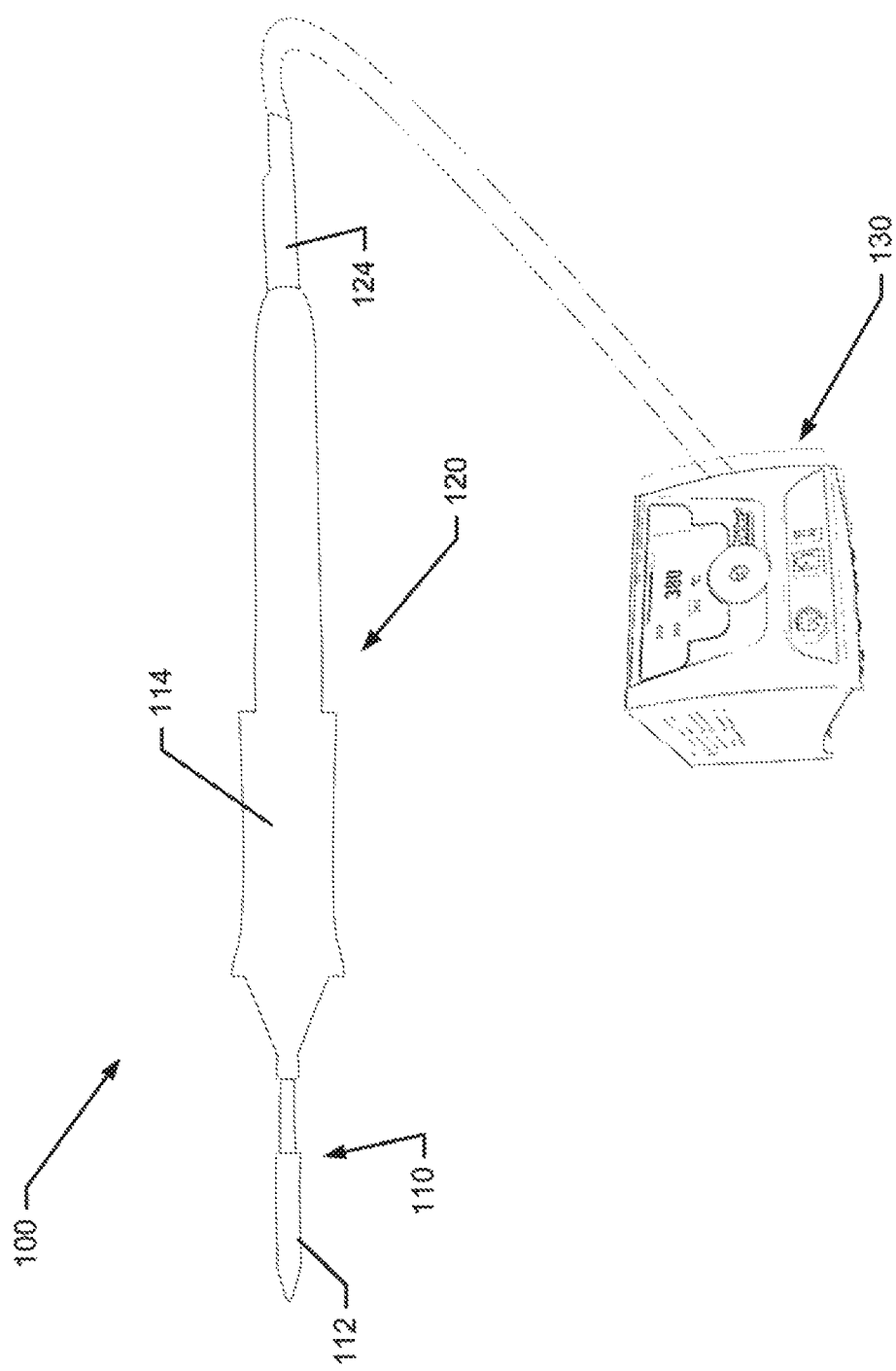
FIG. 1 illustrates a soldering tool structure that may be useful in connection with providing a replaceable soldering tip according to an example embodiment.

FIG. 1 illustrates a soldering tool 100 according to an example embodiment. As shown in FIG. 1, the soldering tool 100 of an example embodiment may include a tip portion 110 that integrates a tip 112 (or bit) together with a handpiece 114 in a single structure. The tip 112 may extend forward of the handpiece 114, generally in line with a longitudinal axis of the tip portion 110. The handpiece 114 may have insulated grips disposed thereon on an external surface thereof. Internally, the handpiece 114 may include electronic components for interfacing with or otherwise driving operation of the soldering tool 100 with respect to providing power for heat generation at the tip 112.

In an example embodiment, the soldering tool 100 may also include a tool body 120 that is configured to support the tip portion 110 and, in some cases, electronics for interfacing with a heating element that heats the tip 112. In particular, the tool body 120 may include electronics (e.g., control circuitry) for directing operation of the components of the tip portion 110, and a power cord or cable 124 that operably couples the tool body 120 to a power unit 130. Thus, the power unit 130 may provide power and/or control signals to the tool body 120 via the cable 124. The power unit 130 may include a power supply and a controller (or microcontroller) that includes electronics for defining modes of operation and/or other control aspects associated with operation of the soldering tool 100. In some cases, the power unit 130 may provide a display and one or more input devices (e.g., buttons, switches, touchscreen inputs, etc.) for interfacing with the power unit 130 (and the controller therein) to control operation of the soldering tool 100.

Figure 2:
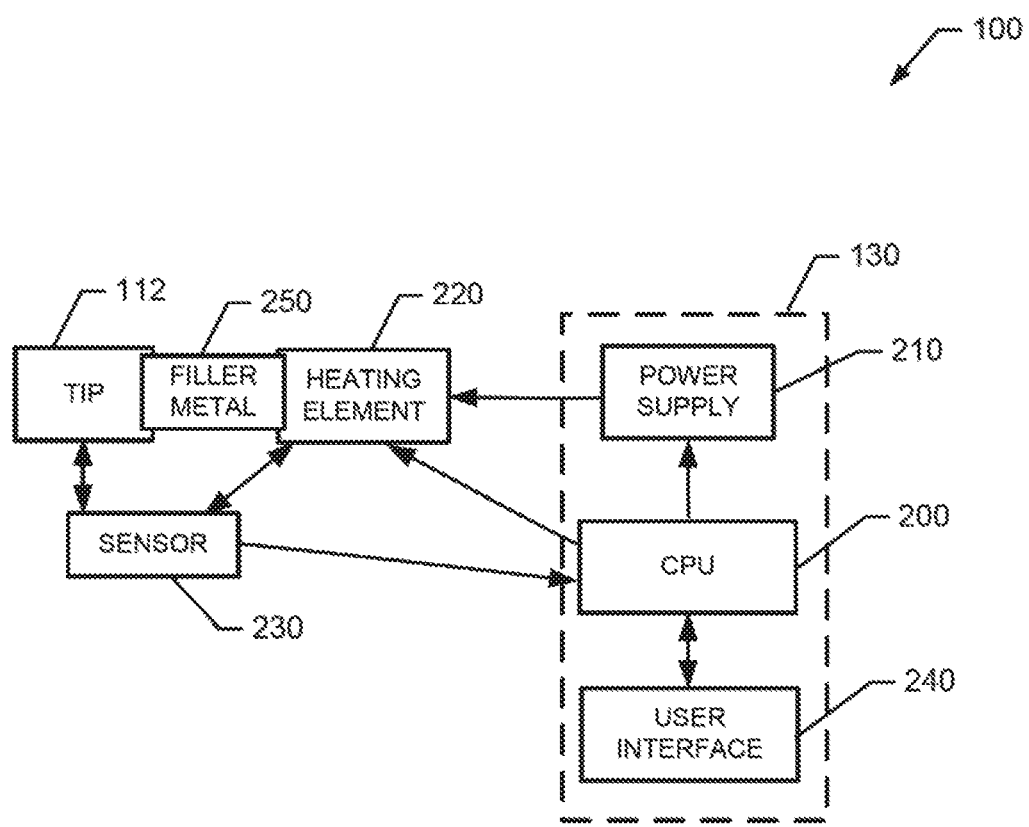
FIG. 2 illustrates a block diagram of the soldering tool according to an example embodiment.

FIG. 2 illustrates a block diagram of various components of the soldering tool 100 in accordance with an example embodiment. Referring now to FIG. 2, the power unit 130 may include processing circuitry in the form of a central processing unit (CPU) 200 or other controller. The CPU 200 may be configured to perform data processing, control function execution and/or other processing and management services for the power unit 130 specifically, and other portions of the soldering tool 100 generally, according to an example embodiment. In some embodiments, the CPU 200 may be embodied as a chip or chip set. In other words, the CPU 200 may comprise one or more physical packages (e.g., chips) including materials, components and/or wires on a structural assembly (e.g., a baseboard). In an example embodiment, the CPU 200 may include one or more instances of a processor and memory that may be in communication with or otherwise control a various components to which the CPU 200 is operably coupled (e.g., the tool body 120, the tip portion 110, and components thereof).

The power unit 130 may also include a power supply 210, which may include transformers, rectifiers and/or any other circuitry configured to condition power provided from mains power or any other suitable source to the voltage and/or current desirable for provision to a heating element 220 of the soldering tool 100 to cause heat to be generated at the heating element 220. The power supply 210 may operate under control of the CPU 200 to generate the desired voltages and/or currents. In some embodiments, the voltages and/or currents may be set to standard levels or settings that are associated with a mode of operation that can be selected by the operator at the power unit 130. However, in some cases, the heating element 220 and/or the tip 112 may be operably coupled to a sensor 230. The sensor 230 may detect the temperature of the heating element 220 and/or the tip 112 and provide feedback to the CPU 200 regarding the temperature(s) detected. The CPU 200 may use the feedback provided from the sensor 230 to provide dynamic or adaptive control to the power supply 210 and/or the heating element 220 to generate the desired temperature(s).

In some embodiments, the power unit 130 may further include a user interface 240. The user interface 240 may be in communication with the CPU 200 to receive an indication of a operator input at the user interface 240 and/or to provide an audible, visual, tactile or other output to the operator. As such, the user interface 240 may include, for example, a display, one or more switches, lights, buttons or keys (e.g., function buttons), and/or other input/output mechanisms. In an example embodiment, the user interface 240 may include one or a plurality of colored lights or a simple display to indicate operational status, mode or other relatively basic information. However, more complex interface mechanisms could be provided in some cases including menu options that allow the operator to navigation through a list of options and make selections to control various aspects of operation of the soldering tool 100. For example, the user interface 240 may include a menu of control options that allow changing of modes from a normal operation mode (and corresponding normal temperature setting for the heating element 220) or a tip replacement mode (and corresponding higher temperature setting for the heating element 220) as discussed in greater detail below.

The power unit 130 may provide power to the heating element 220, which may be or include a resistive element that generates heat responsive to the running of current therethrough. The heating element 220 may be made of stainless steel, or another conductive or metallic material that provides rigidity to the design, but also allows power provided to the heating element 220 to be converted to heat for heating up the tip 112. Accordingly, the power unit 130 may provide power, under control of the CPU 200, to heat the heating element 220, which in turn transfers heat (by thermal conduction) to the tip 112. The tip 112 may then transfer heat to metal in contact with the tip 112 to melt such metal.

Normally, and during the normal operation mode, the metal that is heated by the tip 112 is solder. Solder is a filler metal with a relatively low melting point (e.g., 250° C. or lower) that is used to join components at relatively low temperatures. Thus, in the normal operation mode, the heating element 220 is controlled to generate tip temperatures of about 450° C. to efficiently melt the solder. The heating element 220 is generally capable of achieving a wide range of temperatures, depending on the voltage or current supplied by the power unit 130. Accordingly, in the normal operation mode, the CPU 200 drives the power supply 210 to achieve a temperature of about 450° C. at the tip 112, although other temperatures could be achieved. In a conventional soldering tool, a single temperature setting (e.g., 450° C.) may be the only setting needed and/or provided by the power unit 130. However, in an example embodiment, a higher temperature setting may also be provided to enable melting other filler metals (e.g., brazing filler metals) to allow a braze joint between the tip 112 and the heating element 220 to be made by the operator.

Accordingly, as shown in FIG. 2, a brazing filler metal 250 may be provided between the heating element 220 and the tip 112, and the CPU 200 may allow the power unit 130 to achieve temperatures at the tip 112 and/or heating element 220 that are sufficient to melt the brazing filler metal 250 to form the braze joint between the heating element 220 and the tip 112. Moreover, the CPU 200 may also be used to control the power unit 130 to generate such temperatures to melt the brazing filler metal 250 to allow the braze joint to be broken and the tip 112 to be replaced with another (i.e., a new) tip. In an example embodiment, the higher temperature (i.e., brazing temperature) of the heating element 220 may be achieved by utilizing the CPU 200 to select the tip replacement mode. The tip replacement mode may set the heating element 220 to achieve a temperature of greater than 600° C. (e.g., from about 600 to 700° C.) at the heating element 220 and/or tip 112. The brazing filter metal 250 may be any suitable metal, although silver-tin alloys, or other alloys that melt in the range of about 600 to 700° C. may be employed in some example embodiments.

FIG. 3, which is defined by FIGS. 3A, 3B and 3C, illustrates a conceptual block diagram of various components associated with the process by which a braze joint may be formed or broken between the heating element 220 and the tip 112 in accordance with an example embodiment. In this regard, for example, FIG. 3A shows the components involved separated from each other and FIG. 3C shows the components connected to each other (i.e., with the braze joint intact). FIG. 3B illustrates a view of the components in a transitional state. Thus, a tip 112 can be installed, and a braze joint formed by transitioning from operations that will be described in reference to FIG. 3A to 3C through operations associated with a description of FIG. 3B. Meanwhile, the braze joint can be broken so that the tip 112 can be removed by transitioning in the reverse direction (i.e., from FIG. 3C to FIG. 3A).

In this regard, for installing the tip 112, the CPU 200 may be employed to select the tip replacement mode thereby causing the heating element 220 to be heated to a temperature of greater than 600° C. As shown in FIG. 3A, the tip 112 may have a receiving cavity 270 formed at a portion thereof (e.g., at a proximal end thereof). The receiving cavity 270 may be shaped to receive a distal end of the heating element 220 therein. The shapes of the receiving cavity 270 and the distal end of the heating element 220 may be complementary in some cases. To the extent that the shapes of the receiving cavity 270 and the distal end of the heating element 220 are complementary, it should be appreciated that any shapes could be employed. For example, the receiving cavity 270 and the distal end of the heating element 220 may have spherical, conical or other shapes employed therein complementary to each other at ends thereof. Meanwhile, a cross section of the receiving cavity 270 and the distal end of the heating element 220 could be circular, hexagonal, square, or any other suitable shape, and the diameter of the receiving cavity 270 may be slightly larger than the diameter of the distal end of the heating element 220. This mismatch in size may desirably be kept relatively small to improve the quality of the braze joint. In some cases, the difference in size may be less than 0.4 mm. Moreover, in some cases, the difference may be less than a tenth of a millimeter including extension to differences of as little as, for example, 0.03 or 0.04 mm.

In an example embodiment, a predetermined amount of the brazing filler material 250 may be inserted into the receiving cavity 270, and the heating element 220 may also be inserted into the receiving cavity 270 as shown in FIG. 3B. As pressure is applied in the direction of arrow 275, the brazing filler material 250 may be pushed against the distal end of the receiving cavity 270 and be effectively pinched between the distal end of the receiving cavity 270 and the distal end of the heating element 220. As the brazing filler material 250 is heated by the heating element 220, the brazing filler material 250 may begin to melt. With continued pressure applied in the direction of arrow 275, the melted brazing filler material 250 may begin to fill the gaps formed around the circumference of the distal end of the heating element 220 (i.e., around the periphery thereof) and between the internal circumference of the receiving cavity 270. The heating element 220 may continue to advance into the receiving cavity 270 and displace the melted brazing filler material 250 to eliminate air gaps between the tip 112 and the heating element 220 while the brazing filler material 250 moves through capillary action in the direction opposite the direction of arrow 275. In an example embodiment, the heating element 220 may be provided with a guide line 280 that is to be aligned with a proximal end 290 of the tip 112. When the guide line 280 is aligned with the proximal end 290 of the tip 112 as shown in FIG. 3C, the thickness of the melted brazing filler material 250 may be substantially even around the distal end of the heating element 220 for optimal elimination of air gaps and efficiency of heat transfer from the heating element 220 to the tip 112. Accordingly, for example, the guide line 280 and the amount of material used for the brazing filler material 250 may each be determined based on achieving substantially uniform thickness of the braze joint formed around all sides of the distal end of the heating element 220 that are surrounded by the receiving cavity 270.

When the tip 112 is installed to the position shown in FIG. 3C, the user interface 240 may be used to interface with the CPU 200 to remove the soldering tool 100 from the tip replacement mode. The temperature of the heating element 220 will decrease to ambient temperature over time, and the brazing filler material 250 will harden to form the braze joint between the tip 112 and the heating element 220. At this point, for example, the soldering tool 100 may be operated for many heating cycles in the normal operation mode (i.e., at about 450° C.) to melt solder using the tip 112. However, the brazing filler material 250 will not melt at the temperature of the normal operation mode, so the braze joint will not be impacted by such operation. Efficient heat transfer may therefore occur between the heating element 220 and the tip 112 and repeated operation of the soldering tool 100 may be accomplished for various soldering operations while in the normal operation mode.

Of note, although the operations of FIG. 3 assume the tip 112 is held fixed and the heating element 220 is movable relative to the tip 112 during tip replacement, such arrangement could instead also be reversed. For example, the heating element 220 could be held fixed, and the tip 112 could be moved in the direction opposite arrow 275 to apply pressure. Moreover, in some cases, both the tip 112 and the heating element 220 may be allowed to move toward each other.

At some point in the future after continued operation of the soldering tool 100, either due to degradation of the tip 112 or the heat transfer to the solder, it may be desirable to replace the tip 112. At such time, the components of the soldering tool 100 may be substantially as shown in FIG. 3C. The CPU 200 and user interface 240 may be used again to select the tip replacement mode. The heating element 220 may heat up to greater than 600 C and melt the brazing filler material 250. The heating element 220 may then be withdrawn from the tip 112 in the direction opposite arrow 275 in reference to FIG. 3B, and the brazing joint may be broken. At some point, the heating element 220 may be completely withdrawn from the receiving cavity 270, to achieve the separation between the heating element 220 and the tip 112 shown in FIG. 3A, and a new tip and new piece of brazing filler material 250 may be employed to repeat the operations described above for installing the tip 112.

As noted above, the user interface 240 may enable the operator to interface with the CPU 200 to change the mode of operation, and therefore also the temperature setting for the heating element 220. In some example embodiments, the power unit 130 may include a specialized switch, button or other selector that enables a shift out of the normal operation mode and into the tip replacement mode. The selector may be biased, defaulted or otherwise normally positioned in the normal operation mode. Moreover, whenever the selector is taken out of the position associated with the normal operation mode and to the tip replacement mode, the selector may be configured to automatically return to the normal operation mode after completion of the tip replacement or removal. In some cases, the selector may be configured to return to the normal operation mode position each time the power unit 130 is turned on. In other cases, the selector may be configured to return to the normal operation mode position after a predetermined period of time has passed since the selector was moved out of the normal operation mode and/or since heat application stopped following operation in the tip replacement mode.

In some cases, as mentioned above, the user interface 240 may not provide a physical switch or selector, but may instead include a menu option that can be navigated to for mode selection. FIGS. 4A and 4B illustrate examples of basic menu options that may be provided on a display of the user interface 240 to enable the operator to select a desired mode. In this regard, FIG. 4A illustrates a display screen 300 with a number of menu options 310 presented. The menu options 310 shown are merely examples of some options that could be presented and are in no way limiting with respect to alternatives that may be employed in some cases. In some cases, the operator may select a number for the option desired on a keypad. For example, in this case the number "2" may be selected to enter into a mode selection menu. Alternatively, the operator may use a selection button or switch to move an option selector window 320 up or down through options and then select a desired option.

When the mode selection option is selected, the display 330 of FIG. 4B may be provided. The mode selection option may include each mode that the user can select including, for example, the normal operation mode option 340 and the tip replacement mode option 350. As discussed above, the power unit 130 may default to the normal operation mode 340 in some cases and return to such mode by default in a manner similar to that described above. The CPU 200 may direct operation of the heating element 220 to achieve the operating temperatures associated with each respective mode as described above in response to selection of the respective operating mode. The mode selection may occur by entry of the corresponding menu option number or by use of the option selector window 320 as described above. However, other methods of selection are also possible, including touch screen selection options.

In some cases, due to the very high temperatures that are required to melt the brazing filler material 250, it may be desirable to restrict entry into the tip replacement mode. Accordingly, for example, when the selection is made to enter the tip replacement mode, a password, key or other authorization number may be requested in order to validate the request or otherwise allow entry into the tip replacement mode. Accordingly, for example, the display may generate an authorization query 370 for entry of a password or key as shown in FIG. 4C. Alternatively, in some cases, a user identity query 380 may be provided either via a submenu or upon power up of the power unit 130 as shown in FIG. 4D. The operator may either avoid or skip provision of a user identifier in response to the user identity query 380 (thereby entering a default user identifier that does not have access to the tip replacement mode), or the operator may enter a valid user identifier for enhanced access. If the valid user identifier is entered, the submenu option for entering the tip replacement mode may be enabled and displayed for selection. However, if no valid user identifier is entered, then either the submenu option may not be displayed, may not be selectable or in any case the operator may remain unable to enter the tip replacement mode.

In some example embodiments, it may be desirable to prompt the operator regarding tip replacement in order to keep the efficiency of the soldering tool 100 high. Thus, for example, the CPU 200 may be configured to provide an indication to the operator regarding tip replacement based on an operational history of the soldering tool 100. In this regard, for example, the operational history of the soldering tool 100 may include operational data associated with a number of heating cycles of the heating element 220, a number of run hours of the soldering tool 100, or an age of the tip 112 (e.g., as measured since a last time the tip replacement mode was entered). Other ways of tracking operational history, and prompting the operator may also be employed.

FIG. 5 illustrates a method of installing a tip at a tip portion of a soldering tool in accordance with an example embodiment. The method may include operating a heating element of the soldering tool, where the heating element is configured to melt solder at a first temperature range, at a second temperature range that is higher than the first temperature range at operation 410. The method may further include providing a brazing filler material in a receiving cavity of the tip at operation 420 and inserting a distal end of the heating element into the receiving cavity to melt the brazing filler material into a space defined between the heating element and the receiving cavity to form a braze joint between the heating element and the tip at operation 430. Within the context of the method described above, it should be appreciated that the brazing filler material has a melting point above the first temperature range and below the second temperature range. The first temperature range may be less than about 450° C. and the second temperature range may be greater than about 600° C.

In some cases, the method described above may be augmented or modified by altering individual operations mentioned above or adding optional operations. The augmentations or modifications may be performed in any combination and in any order. For example, in some cases, the braze joint may include a new braze joint and the tip comprises a new tip, and the method further include an initial operation of operating the heating element at the second temperature range to brake an old braze joint and remove an old tip at operation 400. In some cases, the method may further include applying pressure to the tip or the heating element to insert the distal end of the heating element into the receiving cavity until a proximal end of the receiving cavity aligns with a guide line formed at a portion of the heating element at operation 440. In an example embodiment, operating the heating element at the second temperature range may be enabled based on an identity of an operator or based on provision of an authorization password, code or key.

Thus, according to an example embodiment, a soldering tool may be provided. The soldering tool may include a power unit including a controller, a tool body configured to interface with the power unit, and a tip portion operably coupled to the tool body. The tip portion may include a tip that is heated to melt solder by a heating element controlled by the controller. The tip is operably coupled to the heating element via a braze joint. The heating element may be operable at a first temperature range for melting the solder and a second temperature range, higher than the first temperature range, to facilitate forming or braking the braze joint.

In some cases, the tool described above may be augmented or modified by altering individual features mentioned above or adding optional features. The augmentations or modifications may be performed in any combination and in any order. For example, in some cases, the first temperature range may be less than about 450° C. In an example embodiment, the second temperature range may be greater than about 600° C. In some cases, the tip may be a replaceable tip such that the braze joint is broken to remove an old tip and the braze joint is formable with a new tip. In an example embodiment, the controller may be disposed at a power unit operably coupled to the tool body via a cable. In some cases, the power unit may include a display. The display may provide menu options including a first option for selection of a normal operation mode, and a second option for selection of a tip replacement mode. The first temperature range may be employed in the normal operation mode and the second temperature range may be employed in the tip replacement mode. In an example embodiment, the tip replacement mode is enabled based on a user identifier associated with an operator of the soldering tool or based on a password, key or code entered at the display responsive to selection of the tip replacement mode. In some cases, the tip may include a receiving cavity shaped complementary to a shape of a distal end of the heating element. A brazing filler material may be provided in the receiving cavity. The brazing filler material may have a melting point above the first temperature range and below the second temperature range. Responsive to the heating element being at the second temperature range, the distal end of the heating element may be insertable into the receiving cavity to melt the brazing filler material into a space defined between the receiving cavity and the heating element. In an example embodiment, the heating element may be provided with a guide line. Pressure may be applied to the tip or the heating element during insertion of the heating element into the receiving cavity to align the guide line with a proximal end of the tip. Responsive to alignment of the guide line with the proximal end of the tip, a thickness of the braze joint may be substantially uniform at between about 0.03 mm and 0.4 mm. In some cases, the controller may be configured to provide an indication to the operator regarding tip replacement based on an operational history of the soldering tool. In an example embodiment, the operational history may include data associated with a number of heating cycles of the heating element, a number of run hours of the soldering tool, or an age of the tip.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A soldering tool comprising:
 a power unit comprising a controller;
 a tool body configured to interface with the power unit; and
 a tip portion operably coupled to the tool body and including a tip that is heated to melt solder by a heating element under control of the controller,
 wherein the tip is operably coupled to the heating element via a braze joint, and
 wherein the heating element is operable at a first temperature range for melting the solder and a second temperature range, higher than the first temperature range, to facilitate forming or breaking the braze joint;
 wherein the tip comprises a receiving cavity shaped complementary to a shape of a distal end of the heating element;
 wherein a brazing filler material is provided in the receiving cavity, the brazing filler material having a melting point above the first temperature range and below the second temperature range;
 wherein, responsive to the heating element being at the second temperature range, the distal end of the heating element is insertable into the receiving cavity to melt the brazing filler material into a space defined between the receiving cavity and the heating element;
 wherein the heating element is provided with a guide line, and wherein pressure is applied to the tip or the heating element during insertion of the heating element into the receiving cavity to align the guide line with a proximal end of the tip.

2. The soldering tool of claim 1, wherein the first temperature range is less than about 450° C.

3. The soldering tool of claim 2, wherein the second temperature range is greater than about 600° C.

4. The soldering tool of claim 1, wherein the tip is a replaceable tip such that the braze joint is broken to remove an old tip and the braze joint is formable with a new tip.

5. The soldering tool of claim 1, wherein the controller is disposed at a power unit operably coupled to the tool body via a cable.

6. The soldering tool of claim 5, wherein the power unit comprises a display,
 wherein the display provides menu options including a first option for selection of a normal operation mode, and a second option for selection of a tip replacement mode, and
 wherein the first temperature range is employed in the normal operation mode and the second temperature range is employed in the tip replacement mode.

7. The soldering tool of claim 6, wherein the tip replacement mode is enabled based on a user identifier associated with an operator of the soldering tool.

8. The soldering tool of claim 6, wherein the tip replacement mode is enabled based on a password, key or code entered at the display responsive to selection of the tip replacement mode.

9. The soldering tool of claim 1, wherein, responsive to alignment of the guide line with the proximal end of the tip, a thickness of the braze joint is substantially uniform at between about 0.03 mm and 0.4 mm.

10. The soldering tool of claim 1, wherein the controller is configured to provide an indication to the operator regarding tip replacement based on an operational history of the soldering tool.

11. The soldering tool of claim 10, wherein the operational history includes data associated with a number of heating cycles of the heating element, a number of run hours of the soldering tool, or an age of the tip.

12. A method of installing or removing a tip at a tip portion of a soldering tool;
 wherein the soldering tool comprises:
  a power unit comprising a controller,
  a tool body configured to interface with the power unit; and
  a tip portion operably coupled to the tool body and including a tip that is heated to melt solder by a heating element under control of the controller, the tip being operably coupled to the heating element via a braze joint;
 wherein the method comprises:
  operating the heating element of the soldering tool, the heating element being configured to melt solder at a first temperature range and at a second temperature range that is higher than the first temperature range to facilitate forming a braze joint;
  providing a brazing filler material in a receiving cavity of the tip, the receiving cavity being shaped complementary to a shape of a distal end of the heating element, the brazing filler material having a melting point above the first temperature range and below the second temperature range;
  while the heating element heated to a temperature within the second temperature range, inserting the distal end of the heating element into the receiving cavity to melt the brazing filler material into a space defined between the heating element and the receiving cavity to form the braze joint between the heating element and the tip; and
  applying pressure to the tip or the heating element to insert the distal end of the heating element into the receiving cavity until a proximal end of the receiving cavity aligns with a guide line of the heating element.

13. The method of claim 12, wherein the braze joint comprises a new braze joint and the tip comprises a new tip, and wherein the method further comprises an initial operation of operating the heating element at the second temperature range to break an old braze joint and remove an old tip.

14. The method of claim 12, wherein the first temperature range is less than about 450° C.

15. The method of claim 14, wherein the second temperature range is greater than about 600° C.

16. The method of claim 12, wherein operating the heating element at the second temperature range is enabled based on an identity of an operator.

17. The method of claim 12, wherein operating the heating element at the second temperature range is enabled based on provision of an authorization password, code or key.

* * * * *